United States Patent
Kamatani et al.

(10) Patent No.: US 8,866,421 B2
(45) Date of Patent: Oct. 21, 2014

(54) MOTOR DRIVE CONTROLLER AND CONTROL METHOD

(71) Applicants: Tomohiko Kamatani, Hyogo (JP); Haruyuki Suzuki, Kanagawa (JP); Fumihiro Shimizu, Kanagawa (JP); Katsuhisa Furuse, Hyogo (JP)

(72) Inventors: Tomohiko Kamatani, Hyogo (JP); Haruyuki Suzuki, Kanagawa (JP); Fumihiro Shimizu, Kanagawa (JP); Katsuhisa Furuse, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 178 days.

(21) Appl. No.: 13/658,119

(22) Filed: Oct. 23, 2012

(65) Prior Publication Data

US 2013/0106327 A1    May 2, 2013

(30) Foreign Application Priority Data

Oct. 28, 2011    (JP) .................................. 2011-237169

(51) Int. Cl.
    *H02P 6/16*    (2006.01)
(52) U.S. Cl.
    CPC ........................................ *H02P 6/16* (2013.01)
    USPC ............ 318/400.06; 318/400.04; 318/400.01; 318/700
(58) Field of Classification Search
    CPC ........................................................ H02P 6/16
    USPC .................. 318/400.06, 400.04, 400.01, 700
    See application file for complete search history.

(56) References Cited

U.S. PATENT DOCUMENTS

| | | | |
|---|---|---|---|
| 5,493,187 A | * | 2/1996 | Iijima ........................ 318/400.14 |
| 2006/0197480 A1 | | 9/2006 | Mori et al. |
| 2013/0026966 A1 | | 1/2013 | Yanagita et al. |

FOREIGN PATENT DOCUMENTS

| | | |
|---|---|---|
| JP | 05-276778 | 10/1993 |
| JP | 2001-37279 | 2/2001 |
| JP | 2006-230120 | 8/2006 |
| JP | 2009-254040 | 10/2009 |
| JP | 2011-41417 | 2/2011 |
| WO | WO2011/132411 | 10/2011 |

OTHER PUBLICATIONS

Korean official action dated Apr. 30, 2014 in corresponding Korean patent application No. 10-2012-0120654.

* cited by examiner

*Primary Examiner* — David Luo
(74) *Attorney, Agent, or Firm* — Cooper & Dunham LLP

(57) ABSTRACT

A motor drive controller to drive a motor, based on multiple sensors that generates multiple sensor signals corresponding to different positions of the rotor; including a first phase detector to compare a respective one of the multiple sensor signals with a paired sensor signal from the same sensor to detect phases of the rotor, and output a first phase information signal representing a first detected phase; a phase divider to divide the phases, detected by the first phase detector into multiple predetermined phase intervals; a signal selector to select one of the respective multiple sensor signals from the multiple sensors in the multiple predetermined phase interval; and a second phase detector to detect whether the signal selected by the signal selector reaches a predetermined threshold level corresponding to a predetermined phase of the rotor, and output a second phase information signal representing a second detected phase.

20 Claims, 14 Drawing Sheets

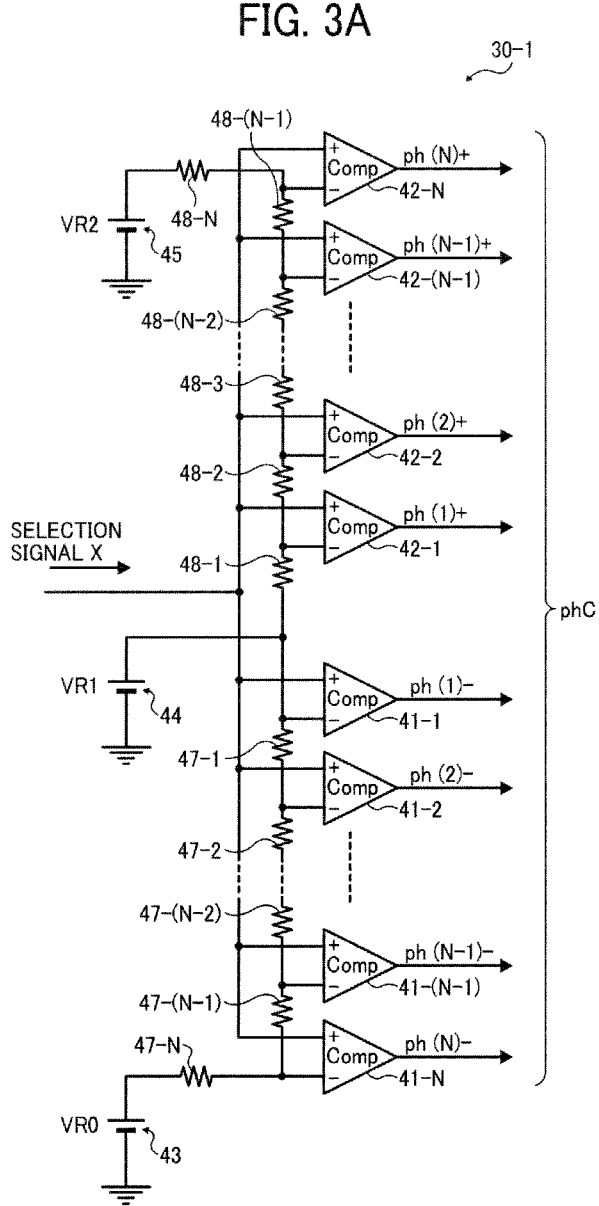

MOTOR DRIVE CONTROLLER AND CONTROL METHOD

CROSS-REFERENCE TO RELATED APPLICATION

This patent application is based on and claims priority pursuant to 35 U.S.C. §119 to Japanese Patent Application No. 2011-237169, filed on Oct. 28, 2011 in the Japan Patent Office, the entire disclosure of which is hereby incorporated by reference herein.

FIELD

1. Technical Field

The present disclosure relates to a motor drive controller including a phase detector to detect a phase of a rotor of a motor, and more particularly, to a motor drive controller employing a control method that drives the motor using the readings from a phase detector.

2. Description of the Related Art

When a rotary position of a motor is controlled, it is necessary to detect a rotational angle of the rotor. In general, relative rotational angle of the rotor is detected by connecting a rotary shaft of the motor to a rotary encoder, outputting a two-phase pulse signal having a phase difference of a quarter cycle that changes with the rotational angle, and detecting edges and high/low state of the two-phase pulse signal.

The optical encoder typically includes a disk in which slits (serving as optical window) are formed equidistantly around the periphery of the disk, and two photo-interrupters arranged at a quarter interval of the slit pitch of the disk. By binarizing two output signals from the two photo-interrupters, the two-phase pulse signal can be acquired.

In addition, in JP-3500328-B (JP-2001-037279-A), a motor drive controller obtains most of the phase information (position information) of the motor without using the optical encoder, and drives the motor. More specifically, an inverter of the motor drive controller outputs a hole-sensor edge whenever a rotation change happens that corresponds to an electrical angle of 60° of the rotor of the brushless motor, measures times of the edge intervals of the hole-sensor, and generates a cycle pulse signal having 1/32 of the measured edge interval time. That is, the inverter obtains phase information that divides 60° into 32 equal parts.

However, in this example of the motor drive controller, when a rotational velocity of the rotor changes in the hole-sensor edges, some error between an estimated rotary position change of the rotor and an actual rotary change may appear, and accurate phase information cannot be obtained.

Further, in JP-2011-41417-A, a motor drive controller obtains most of the phase information (position information) of the motor and drives the motor without using an absolute-type rotary encoder. More specifically, using a hole-sensor signal at electrical angle intervals of 60° and a function-generator or frequency-generator (FG) signal to generate a pulse signal having an angle fluctuation smaller than that of the hole-sensor signal, or detecting and processing count by optical encoder, the motor drive controller acquires more detailed phase information with which to drive the motor.

However, in this example, although the motor drive controller can to some extent cope with rotary velocity change at the hole sensor edge interval due to use of an FG signal having smaller intervals than the hole sensor edge interval, doing so requires counting processors for counting the sensor signal and the FG signal, a FG signal generator or increment-type optical encoder, and a FG signal amplifier, all of which may increase the device size and cost of manufacture.

SUMMARY

In one aspect of this disclosure, there is provided a motor drive controller to drive and control a motor that has a rotor and multi-phase coils inside the rotor, based on multiple rotational angle detectors that generate multiple sensor signals corresponding to different positions of the rotor. The motor drive controller includes a first phase detector, a phase divider, a signal selector, and a second phase detector. The first phase detector compares a respective one of multiple sensor signals with a paired sensor signal from the same rotational angle detector to detect phases of the rotor, and outputs a first phase information signal representing a first detected phase. The phase divider divides the phases, detected by the first phase detector, into multiple predetermined phase intervals. The signal selector selects one of the respective multiple sensor signals from the multiple sensors, in the multiple predetermined phase interval. The second phase detector detects whether the signal selected by the signal selector reaches a predetermined threshold level corresponding to a predetermined phase of the rotor, and outputs a second phase information signal representing a second detected phase different from the first detected phase.

In another aspect of this disclosure, there is provided another motor drive controller to drive and control a motor that has a rotor and multi-phase coils inside the rotor, based on multiple rotational angle detectors to generate multiple sensor signals corresponding to different positions of the rotor. The motor drive controller includes a signal amplifier in addition to a first phase detector, a phase divider, a signal selector, and a second phase detector. The signal amplifier adjusts and amplifies amplitudes of the multiple sensor signals. The first phase detector compares a respective one of the multiple amplified sensor signals with a paired amplified sensor signal from the same rotational angle detector via the signal amplifier to detect phases of the rotor, and outputs a first phase information signal representing a first detected phase. The phase divider divides the phases, detected by the first phase detector, into multiple predetermined phase intervals. The signal selector selects one of the respective multiple amplified sensor signals from the signal amplifier, in the multiple predetermined phase interval. The second phase detector detects whether the signal selected by the signal selector reaches a predetermined threshold level corresponding to a predetermined phase of the rotor, and outputs a second phase information signal representing a second detected phase different from the first detected phase.

In another aspect of this disclosure, there is provided a control method of driving and controlling a motor that has a rotor and multi-phase coils inside the rotor, based on multiple sensor signals, generated by rotational angle detectors, corresponding to different positions of the rotor. The method includes the steps of: comparing a respective one of the multiple sensor signals with a paired sensor signal from the same rotational angle detector to detect phases of the rotor; outputting a first phase information signal representing a first detected phase; dividing the detected phase into multiple predetermined phase intervals; selecting one of the multiple sensor signals, in the multiple predetermined phase interval; detecting that a level of the selected signal reaches a predetermined threshold level corresponding to a predetermined phase of the rotor; and outputting a second phase information signal representing a second detected phase different from the first detected phase.

BRIEF DESCRIPTION OF THE DRAWINGS

The aforementioned and other aspects, features, and advantages will be better understood by reference to the following detailed description when considered in connection with the accompanying drawings, wherein:

FIG. 3A is a circuit diagram illustrating a first configuration of a second phase-information detection circuit shown in FIG. 1 according to the first embodiment;

DETAILED DESCRIPTION OF PREFERRED EMBODIMENTS

Figure 1:
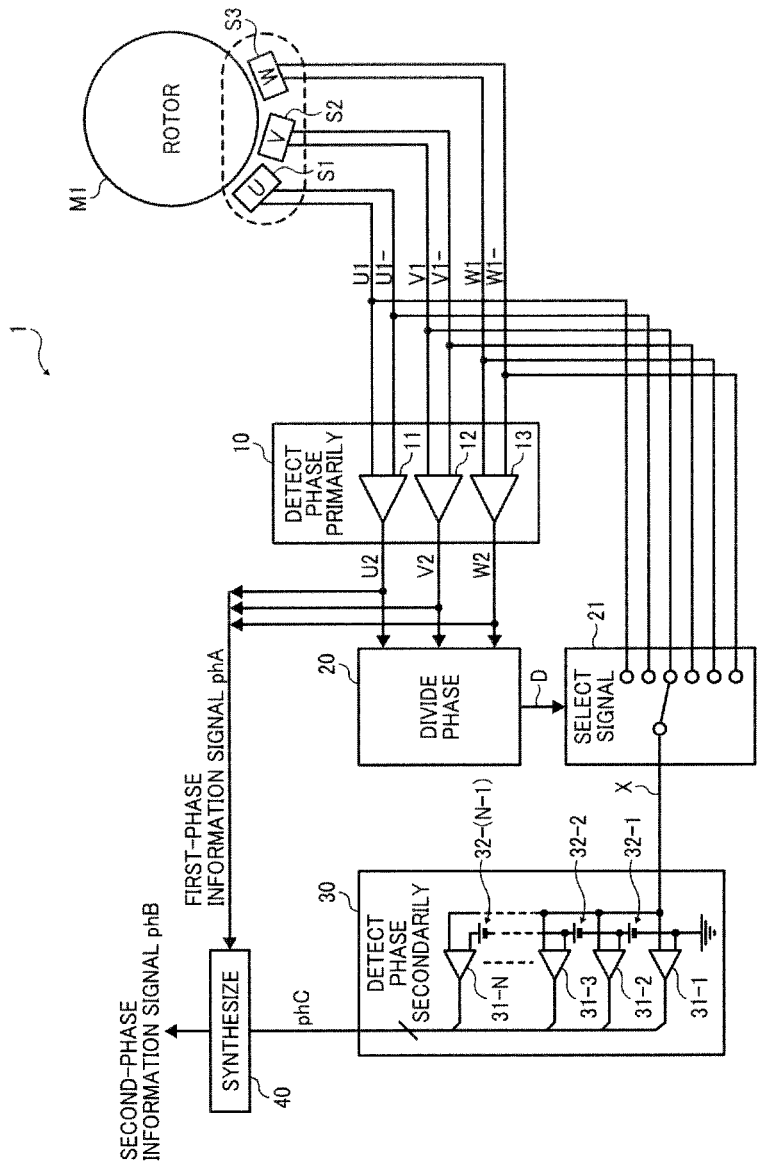
FIG. 1 is a block diagram illustrating a configuration of a motor drive controller according to a first embodiment of the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, particularly to FIGS. 1 through 11 motor drive controllers according to illustrative embodiments are described.

First Embodiment

FIG. 1 is a block diagram illustrating a configuration of a motor drive controller 1 according to a first embodiment of the present disclosure.

In FIG. 1, the motor drive controller 1 detects phase information of a motor M1 based on differential sensor signals (U1, U1−; V1, V1−; and W1, W1−) from magnetic sensors (S1, S2, and S3) provided for detecting a rotational angle provided around a rotor of the motor M1. The motor drive controller 1 includes a first phase-information detection circuit 10, a phase dividing circuit 20, a signal selection circuit 21, a second phase-information detection circuit 30, and a synthesis circuit 40.

In FIG. 1, the respective differential sensor signals (U1, U1−; V1, V1−; and W1, W1−) from the sensors (rotational angle detectors) S1, S2, and S3 (U-phase, V-phase, and W-phase) are input to the first phase-information detection circuit 10 and the signal selection circuit 21. The first phase-information detection circuit (first phase detector) 10 includes three comparators 11, 12, and 13. TABLE 1 is a graph illustrating levels of comparison result signals U2, V2, and W2 corresponding to comparison relation of the input sensor signals (U1, U1−; V1, V1−; and W1, W1−) input to the first phase-information detection circuit 10 shown in FIG. 1. As illustrated in TABLE 1, the comparators 11, 12, and 13 compare amplitudes of the input differential sensor signals (U1, U1−; V1, V1−; W1, W1−) generate either high level (Hi) comparison result signals (U2, V2, and W2) or low level (Low) comparison result signals (U2, V2, and W2) for output to the phase dividing circuit 20 and the synthesis circuit 40. More specifically, the first phase-information detection circuit (first phase detector) 10 compares a respective one of multiple sensor signals (e.g., U1) with a paired sensor signal (U1−) from the same rotational angle detector (S1) to detect phases of the rotor. Herein, a first phase information signal PhA is made based on the comparison result signals U2, V2, and W2 from the first phase-information detection circuit 10.

TABLE 1

| COMPARISON RESULT SIGNAL | HIGH | LOW |
| --- | --- | --- |
| U2 | U1 < U1− | U1 ≥ U1− |
| V2 | V1 ≥ V1− | V1 > V1− |
| W2 | W1 ≥ W1 | W1 > W1− |

In FIG. 1, the phase dividing circuit (phase divider) 20 receives the comparison result signals U2, V2, and W2 (PhA) and generates a signal-selection signal D, divided into intervals having predetermined phase-intervals based on the comparison result signals U2, V2, and W2 (PhA), for output to the signal selection circuit 21.

The signal selection circuit (signal selector) 21 also receives the above-described differential sensor signals (U1, U1−; V1, V1−; and W1, W1−). The signal selection circuit 21 selects a suitable signal from the differential sensor signals (U1, U1−; V1, V1−; and W1, W1−), based on the signal-selection signal D from the phase dividing circuit 20, for output to the second phase-information detection circuit 30 as a selection signal X.

The second phase-information detection circuit (second phase detector) 30 mainly includes multiple (N−1 number of) voltage sources 32-1 through 32-(N−1), multiple (N number of) phase detectors 31-1 through 31-N. The second phase-information detection circuit 21 compares the selection signal X with multiple threshold levels generated by the multiple (N−1 number of) voltage sources 32-1 through 32-(N−1) to generate a phase-information signal phC indicating that the motor M1 is rotated at a predetermined angle, for output to the synthesis circuit 40. That is, each of the predetermined threshold level indicates the level corresponding to amplitude of the sensor signals (U1, U1–; V1, –V1; and W1, –W1) from the rotational angle detector S1, S2, and S3 (threshold level corresponding to a predetermined phase of the rotor), which are set in advance.

Then, the synthesis circuit (synthesizer) 40 synthesizes the phase-information signal phC and the first phase-information signal PhA to generate a second phase information signal phB.

Figure 2A:
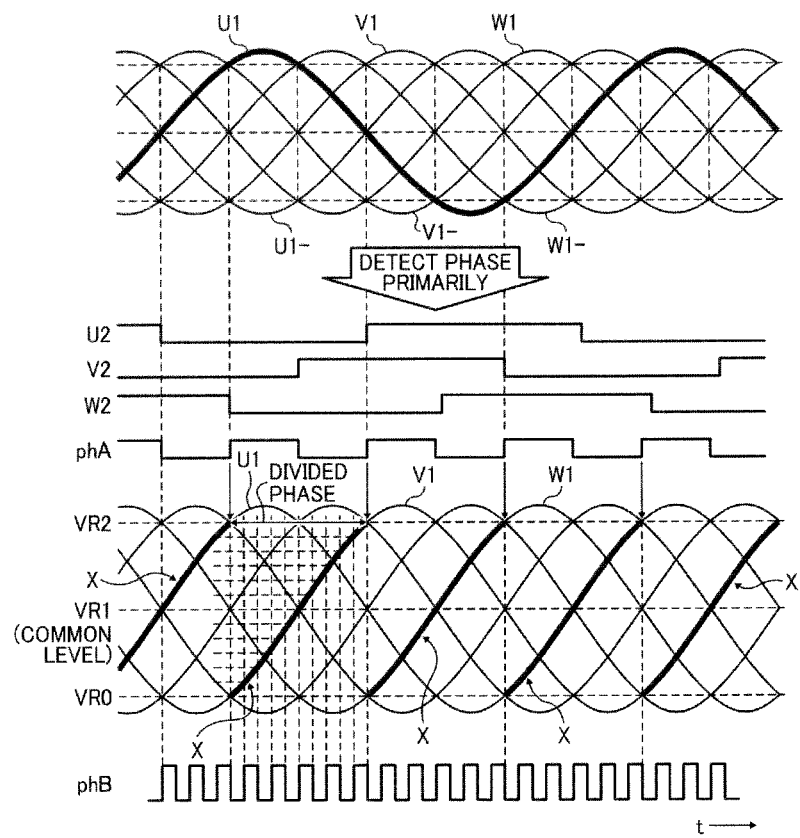
FIG. 2A is a timing chart illustrating operation of the respective signals of the motor drive controller under a first signal selection condition.
Figure 2B:
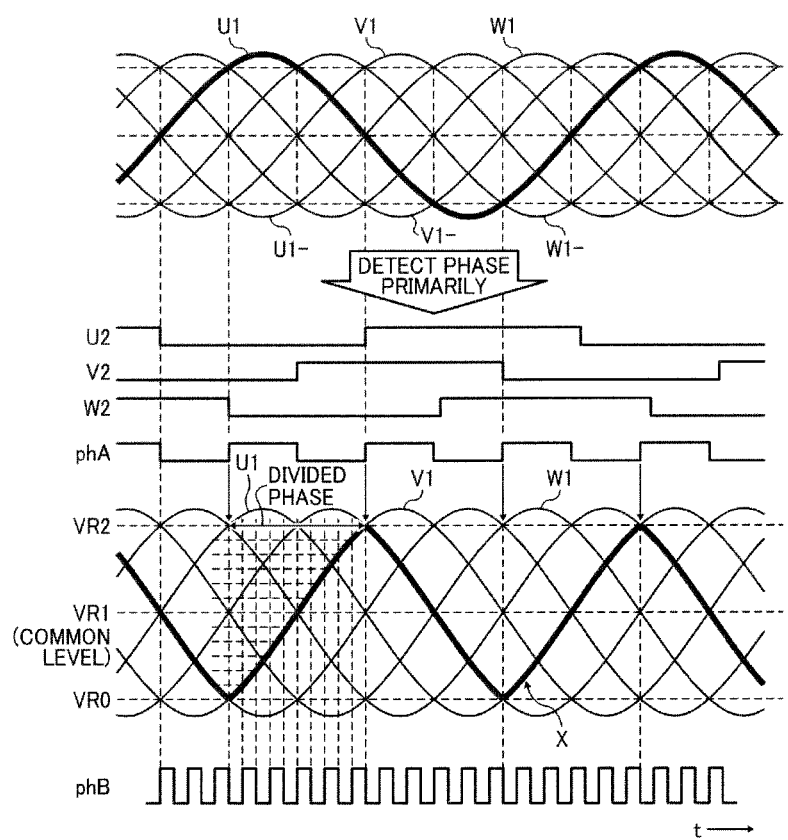
FIG. 2B is a timing chart illustrating operation of the respective signals of the motor drive controller under a second signal selection condition.
Figure 2C:
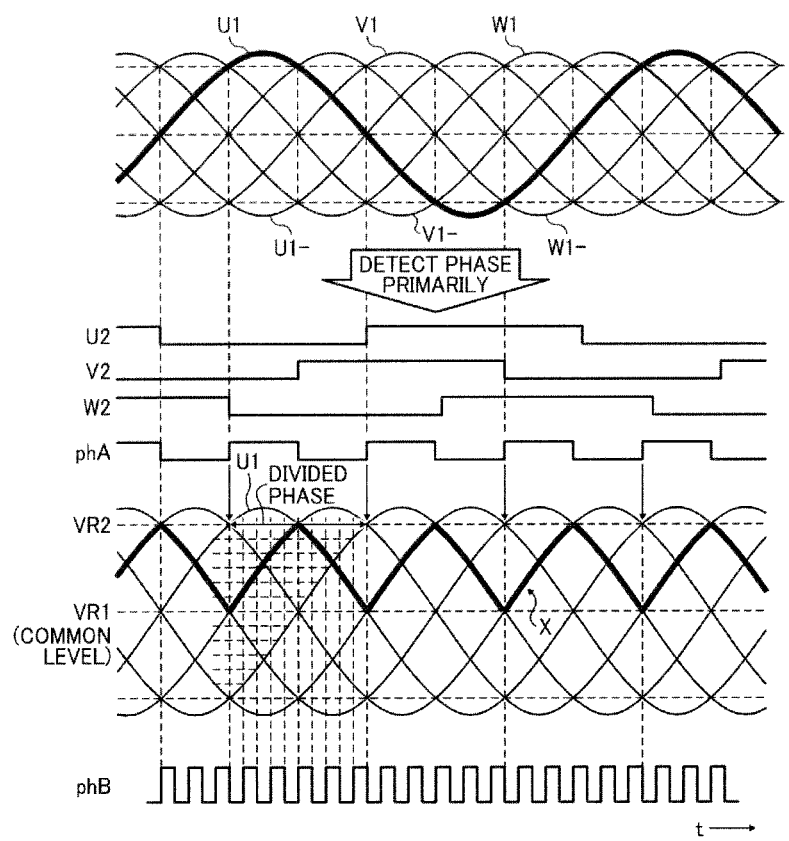
FIG. 2C is a timing chart illustrating operation of the respective signals of the motor drive controller under a third signal selection condition.

FIG. 2A is a timing chart illustrating operation of the respective signals of the motor drive controller 1 under a first signal selection condition. FIG. 2B is a timing chart illustrating operation of the respective signals of the motor drive controller 1 under a second signal selection condition. FIG. 2C is a timing chart illustrating operation of the respective signals of the motor drive controller 1 under a third signal selection condition.

In FIGS. 2A through 2C, non-inverting signals U1, V1, and W1 of the differential sensor signals from the sensors S1, S2, and S3 are illustrated as sine waves or waveform essentially similar to sine waves. Conversely, inverting signals –U1, –V1, and –W1 of the differential sensor signals from the sensors S1, S2, and S3 have waveforms of opposite phase to the sine waveforms. The sensors S1, S2, and S3 are arranged at 120° intervals.

The first phase-information detection circuit 10 obtains the comparison result signals U2, V2, and W2 whose values are changed at a zero-crossing point of the differential sensor signal (U1, U1–; V1, V1–; W1, W1–). The first-phase information signal phA represents a synthesized waveform signal constituted by the comparison result signals U2, V2, and W2 switched at respective edges of the waves.

The phase dividing circuit 20 divides the predetermined phase at predetermined rising edges of the comparison result signals U2, V2, and W2, that is, at predetermined edges of the first phase-information signal phA. During the predetermined divided interval, for example, under the first operation condition shown in FIG. 2A, the phase dividing circuit 20 selects one of from the sensor signals U1, V1, and W1 in accordance with the signal condition shown in TABLE 2 and switches the selected signal based on TABLE 2 for output as a certain selection signal X.

TABLE 2 shows the output signals (selection signal X from the signal selection circuit 21 shown in FIG. 1 under the first signal condition shown in FIG. 2A.

TABLE 2

| CONDITION OF INPUT SIGNALS | SELECTION SIGNAL X |
|---|---|
| U2 = W2 = Lo | V1 |
| U2 = V2 = Hi | W1 |
| V2 = Lo & W2 = Hi | U1 |

The respective selection signals X is represented by a heavy line in a bottom section in FIG. 2A. The respective selection signal X is assigned to 120° intervals within a range from –60° to 60° of the sine wave phase, having highly linearity. That is, the assigned (divided) phase intervals correspond to an electrical angle of 120° of the rotor of the motor M1.

In FIG. 2A, horizontal broken lines indicate the predetermined threshold values VR2 and VR0 generated from the voltage sources 32. When the signal-selection signal D from the phase dividing circuit 20 reaches the predetermined threshold values VR2 and VR0, indicated by the broken line shown in FIG. 2A, the signal selection circuit 21 outputs pulse edges.

For example, when the range of the electrical angle from –60° to 60° is divided into 10 equal parts corresponding to the electrical angles of 12°, the relation between the amplitude width and the electrical angle is illustrated in TABLE 3. TABLE 3 shows the relation between the electrical angle and the amplitude ratio of the selection signal X from the signal selection circuit 21 shown in FIG. 1.

TABLE 3

| ELECTRICAL ANGLE | AMPLITUDE RATIO |
|---|---|
| –60 | –0.866 |
| –48 | –0.743 |
| –36 | –0.588 |
| –24 | –0.407 |
| –12 | –0.208 |
| 0 | 0 |
| 12 | 0.208 |
| 24 | 0.407 |
| 36 | 0.588 |
| 48 | 0.743 |
| 60 | 0.866 |

In TABLE 3, a common level of the differential sensor signal (U1, U1–; V1, V1–; W1, W1–) is set to 0, and the amplitude of the electrical angle of 90° is set to 1. The signal selection circuit 21 determines the predetermined level of the ratios of the electrical angles relative to the amplitude of the sine wave of the selection signal X based on correspondence relation of TABLE 3.

Herein, the electrical angles of –60°, 0°, and 60° are not always necessary for the second phase-information detection circuit 30 because the electrical angles of –60°, 0°, and 60° can be used at zero-crossing points of the respective differential sensor signals (U1, U1–; V1, V1–; W1, W1–).

FIG. 3A is a circuit diagram illustrating a first configuration 30-1 of the second phase-information detection circuit 30 according to the first embodiment. In FIG. 3A, the second phase-information detection circuit 30-1 includes three voltage sources 43, 44, and 45, and multiple (2N number of) resistors 47-N through 47-1, and 48-1 through 48-N connected in series respectively, multiple (2N number of) comparators 41-N through 41-1, and 42-1 through 42-N. The second phase-information detection circuit 30-1 compares the signal amplitude of the selection signal X with the multiple threshold levels and generates and outputs phase detection signals phC ("ph(N)-s" through "ph(1)–", and "ph(1)+" through "ph(N)+", see FIG. 4).

In FIG. 3A, a voltage level VR1 of the voltage source 44 is a center level (common level) of amplitude of the sine wave, a voltage level VR2 of the voltage source 45 corresponds to an upper limit of the amplitude of the sine wave, and a voltage level VR0 of the voltage source 43 is a lower limit of the amplitude of the sine wave. The level divided at amplitude ratio interval corresponding to the electrical angle around the voltage level VR1 is compared with the selection signal X. As the selection signal X is simply increased or simply decreased, the phase detection signal phC is switched in order and is output.

As described above, in the present embodiment, using the phase detection signal phC that outputs every time the selection signal X reaches a predetermined threshold value (VR2, VR0) of the amplitude corresponding to the electrical angles, the phase information exceeding the phase information signal phA at the sensor zero-crossing point can be acquired.

TABLE 3 is just one example of a correspondence relation to acquire the phase information at intervals corresponding to the electrical angle of 12°. As another setting, when the amplitude is divided into intervals corresponding to the electrical angle of 6°, twice of phase information of TABLE 3 can be obtained (for the second phase information signal phB). As yet another setting, when the amplitude is divided at electrical angle of 3°, fourth times of phase information can be obtained.

In FIG. 2A, the selection signal X is within the range from −60° to 60° of the sine wave, and switching angle of the selection signal X is set to 60°, and the subsequent signal is started from −60°. Therefore, the selection signal X is discontinuous signal. In the second phase-information detection circuit 30, when process is carrier out, for example, when the output phase information signal phC is reset, the noise is put on the output signal of the phase information signal phC. Therefore, it is necessary for signal processing for preventing the error information of the phase.

In order to solve this problem, in FIG. 2B, a configuration of the signal selection circuit 21 is changed so that the selection signal X is continuous when the selection signal X is switched. As one example, the signal selection circuit 21 selectively switches the input signal (the differential sensor signal U1, U1−; V1, V1−; W1, W1−) based on correspondence relation of TABLE 4. TABLE 4 shows the output signal (selection signal X) of the signal selection circuit 21 shown in FIG. 1 under the second signal condition shown in FIG. 2B.

TABLE 4

| CONDITION OF INPUT SIGNALS | SELECTION SIGNAL X |
| --- | --- |
| U2 = W2 = Low (2n − 1) | V1 |
| U2 = V2 = Hi (2n − 1) | W1− |
| V2 = Lo & W2 = Hi (2n − 1) | U1 |
| U2 = W2 = Low (2n) | V1− |
| U2 = V2 = Hi (2n) | W1 |
| V2 = Lo & W2 = Hi (2n) | U1− |

In TABLE 4, N = 1, 2, 3 . . . (integer)

Based on TABLE 4, by selectively switching the select on signal at odd-numbered time and at even-numbered time, the continuous selection signal X when the selection signal X is switched can be input to the second phase-information detection circuit 30 as the selection signal X shown in FIG. 2B. That is, reset is not necessary for the second phase-information detection circuit 30 to detect the phase detection signal phC based on the selection signal X, which enables the second phase-information detection circuit 30 to output a Gray-code output signal. In order to distinguish between odd number and even number, only counter is provided in the phase dividing circuit 20.

Alternatively, FIG. 2C illustrates a timing chart when the dividing interval is divided at electrical angle of 60°, and the selection signal X is switched per 60° intervals. That is, the assigned (divided) phase intervals correspond to an electrical angle of 60°. TABLE 5 shows one example of switching of selected signals shown in FIG. 2C. More specifically, TABLE 5 shows the output signals (selection signal X from the signal selection circuit 21 shown in FIG. 1 under the third signal condition shown in FIG. 2C.

TABLE 5

| CONDITION OF INPUT SIGNALS | SELECTION SIGNAL X |
| --- | --- |
| U2 = W2 = Low & V2 = Low | W1− |
| U2 = W2 = Low & V2 = Hi | U1 |
| V2 = V2 = Hi & W2 = Low | U1− |
| V2 = V2 = Hi & W2 = Hi | V1 |

TABLE 5-continued

| CONDITION OF INPUT SIGNALS | SELECTION SIGNAL X |
| --- | --- |
| V2 = Low & W2 = High & U2 = Low | V1− |
| V2 = Low & W2 = High & U2 = High | W1 |

By selecting suitable signal based on TABLE 5, the amplitude of the selection signal X shown in FIG. 2C can be restricted (ranging from the common level VR1 to the upper threshold value VR2) within a half of the signals shown in FIGS. 2A and 2B.

Figure 3B:
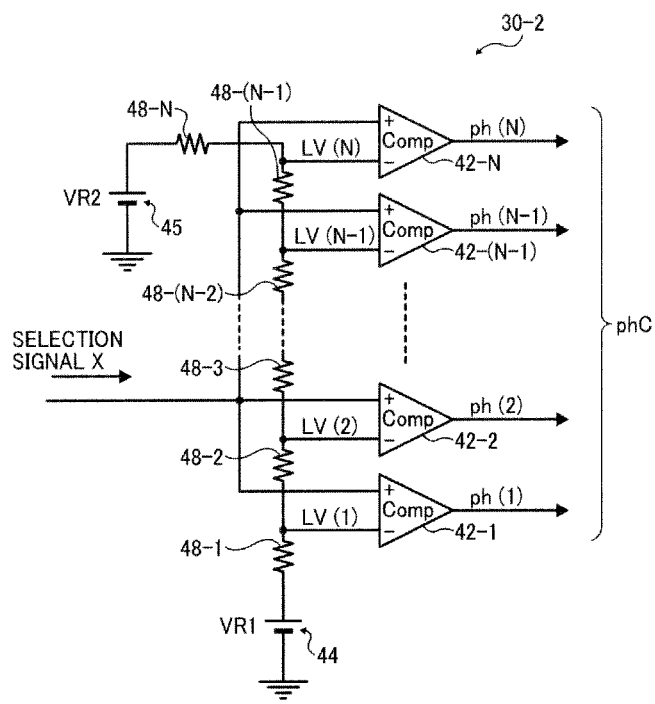
FIG. 3B is a circuit diagram illustrating a second configuration of the second phase-information detection circuit shown in FIG. 1 according to the first embodiment.

FIG. 3B is a circuit diagram illustrating a second configuration 30-2 of the second phase-information detection circuit 30 shown in FIG. 1. The second phase-information detection circuit 30-2 eliminates the circuit lower than the voltage source 44 and the comparator 42-1, compared to the second phase-information detection circuit 30-1 shown in FIG. 3A. In the configuration of FIG. 3B, even when the number of predetermined threshold values in the second phase-information detection circuit 30-2 becomes to half, the second phase-information detection circuit 30-2 shown in FIG. 3B can achieve effects similar to those of the second phase-information detection circuit 30-1, and furthermore, the size of the circuit can be more compact.

Next, one example of the synthesis circuit 20 is described below. The synthesis circuit 20 synthesizes the phase information detection signal phC from the second phase-information detection circuit 30 and the first phase information signal phA from the first phase-information detection circuit 10 to generate a second phase information signal phB that is a digital signal for two-phase.

Figure 4:
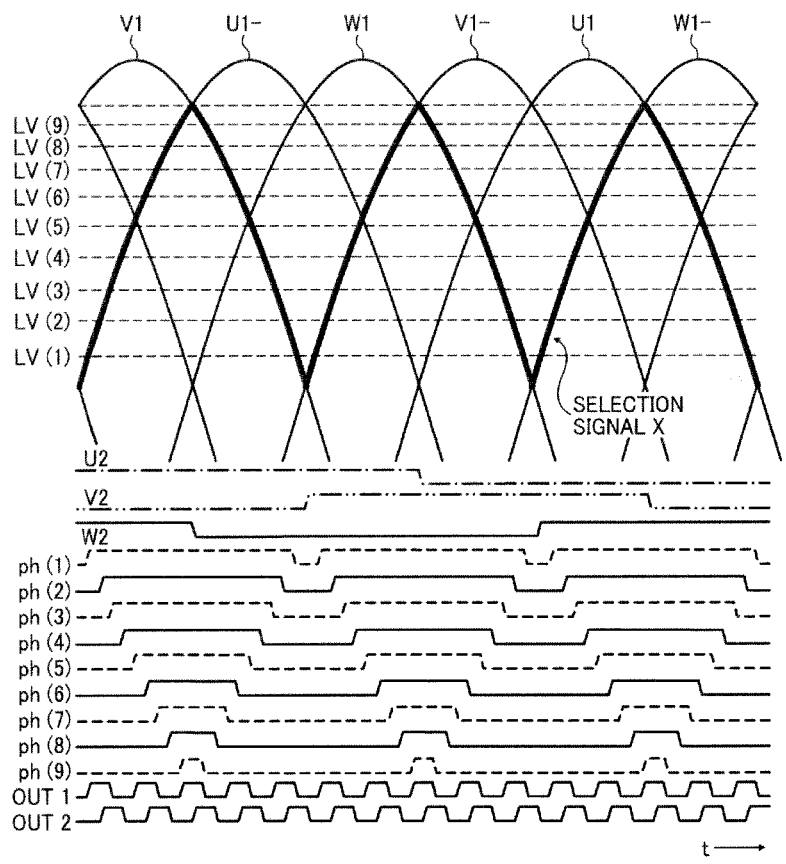
FIG. 4 is a timing chart illustrating operation of signals in the second phase-information detection circuit shown in FIG. 1 using a selection signal shown in FIG. 2C.

FIG. 4 is a timing chart illustrating operation of signals in the second phase-information detection circuit 30 shown in FIG. 1, using the selection signal X under the third selection signal condition shown in FIG. 2C. FIG. 4 illustrates the selection signal X and the phase information detection signals phB, generated from the second phase-information detection circuit 30, containing signals ph(1) through ph(9) corresponding to nine predetermined levels LV(1) through LV(9) to divide the interval corresponding to the electrical angle of 60° into 10 equal parts. The second phase information signal phB from the synthesis circuit 40 is constituted by two types of output digital signals OUT1 and OUT2.

Herein, the output digital signal OUT1 is constituted by synthesizing based on rising edges of the phase information signals ph(1), ph(3), ph(5), ph(7), and ph(9), and the output digital signal OUT2 is constituted by synthesizing based on rising edges of the phase information signals ph(2), ph(4), ph(6), ph(8), U2, V2, and W2. Accordingly, without providing optical encoder, an encoder signal (second phase information signal) having quarter phase difference of cycle can be easily obtained.

In this embodiment, although the phase information signal phB generates two output digital signals OUT1 and OUT2, the present disclosure is not limited above, the phase information signal phB can contain at least one signal or one-phased output signal including required phase information signal In this configuration, the second phase information detection circuit 30 is used in common for the respective phase ranges divided by the phase dividing circuit 20, which can operate at a single circuit and reduce the size of circuit.

Second Embodiment

Figure 5:
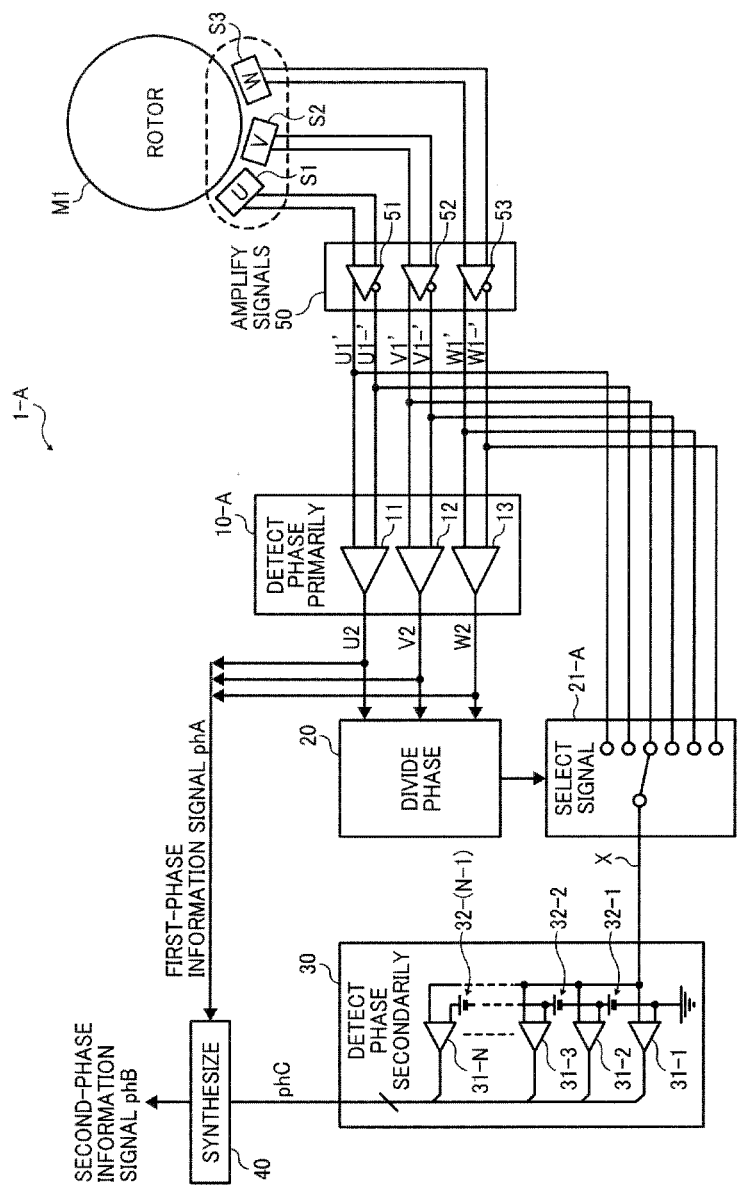
FIG. 5 is a block diagram illustrating a configuration of a motor drive controller according to a second embodiment.

FIG. 5 is a block diagram illustrating a configuration of a motor drive controller 1-A according to a second embodiment.

Compared with the motor driver controller 1 according to the first embodiment, the motor drive controller 1-A according to the second embodiment includes a signal amplifier circuit 50 to adjust amplitude of the differential sensor signal from the sensors S1, S2, and S3 (U-phase, V-phase, and W-phase). The other configuration is similar to the first embodiment, and the description thereof is omitted.

Herein, the signal amplification circuit 50 (signal amplifier) includes three differential amplifiers 51, 52, and 53. In the configuration shown in FIG. 5, the function of the signal amplification circuit 50 is described below.

The common levels or the amplitude levels of the differential sensor signals from the sensors S1, S2, and S3 (U-phase, V-phase, and W-phase) are often uneven or are often very small electrically.

As the common level and the amplitude level are even and as the amplitude is greater, an output signal targeting to a predetermined rotational angle from the second phase-information detection circuit 30 shows a value close to the actual rotational angle of the rotor. That is, even when the differential sensor signals from the sensors S1, S2, and S3 are not even, the signal amplification circuit 50 adjusts the common level, and adjusts and amplifies the amplitude level.

In the present embodiment, the signal amplifier circuit 50 adjusts and amplifies the amplitudes of the differential sensor signals from the sensors S1, S2, and S3 and outputs multiple amplified sensor signals (U1', U1−'; V1', V1−'; W1', W1−') to a first phase-information detection circuit 10-A and a signal selection circuit 21-A.

In this second embodiment, although the first phase-information detection circuit 10 detects the phases of the multiple amplified sensor signals (U1', U1−'; V1', V1−'; W1', W1−') from the signal amplification circuit 50, the present disclosure is not limited above, for example, the sensor signals (U1, U1−; V1, V1−; W1, W1−) from the sensors S1, S2, and S3 may be directly compared, as similar to the first embodiment. When the single-ended signal is output from the signal amplification circuit 50, the first phase-information detection circuit 10-A compares the multiple single-ended signals with multiple threshold values.

In addition, the output signal (amplified sensor signals) from the signal amplification circuit 50 may be formed by a single-ended signal converted from the differential sensor signal, or alternatively, a signal after adjustment and amplification is differentially output. Regardless of the presence of the amplification of the sensor signals, the phase information can be obtained, similarly to the operation shown in FIGS. 2A, 2B, and 2C.

Third Embodiment

Figure 6:
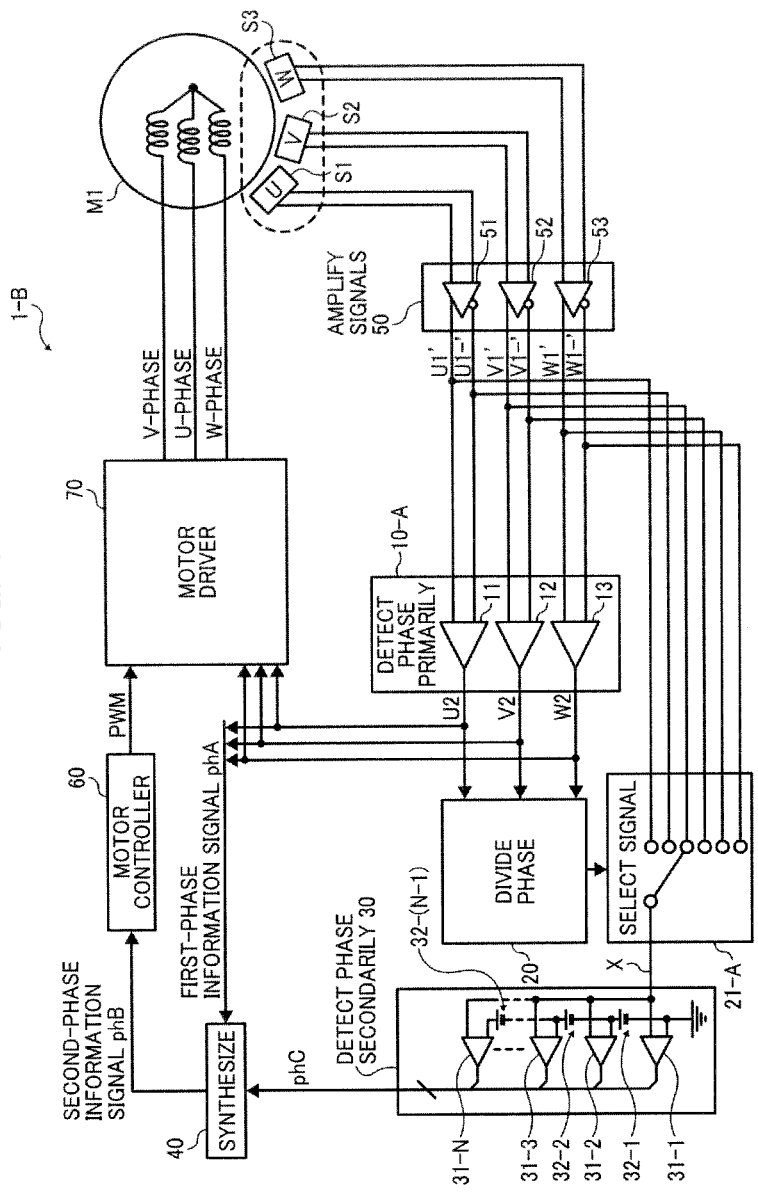
FIG. 6 is a block diagram illustrating a configuration of a motor drive controller according to a third embodiment.

FIG. 6 is a block diagram illustrating a configuration of a motor drive controller 1-B according to a third embodiment.

Compared with the motor drive controller 1-A according to the second embodiment, the motor drive controller 1-B according to the third embodiment includes a motor driver 70 to selectively send driving currents to multiple motor coils to drive rotating the rotary of the motor M1; and a motor controller 60 to generate pulse width modulation (PWM) signal based on the second phase information signal phB and output the PWM signal to the motor driver 70. The other configuration is similar to the first embodiment, and the description thereof is omitted.

Figure 7:
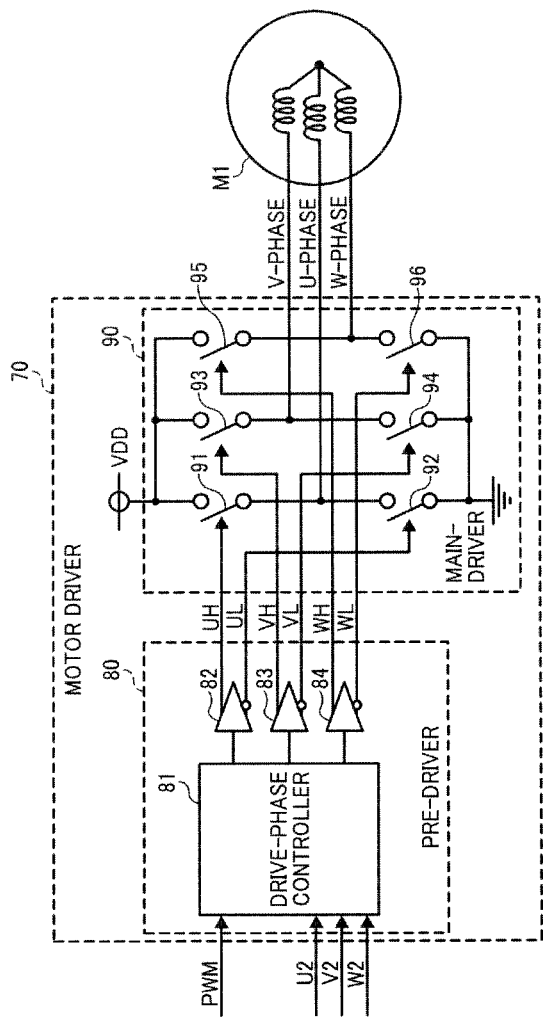
FIG. 7 is a circuit diagram illustrating a configuration of a motor driver shown in FIG. 6.

FIG. 7 is a circuit diagram illustrating a configuration of the motor driver 70 shown in FIG. 6. In FIG. 7, the motor driver 70 includes a pre-driver 80 and a main-driver 90. For example, three-phase coils (U-Phase, V-Phase, and W-Phase) to drive the motor M1 that is a brushless DC motor, are provided inside the motor M1, and the respective three coils are connected in Y-junction inside the motor M1.

Herein, the main driver 90 includes high-side switching elements 91, 93, and 95 connected to a power supply side of the corresponding other side of the coils and low-side switching elements 92, 94, and 96 connected to ground. The main driver 90 receives switch-control signals UH, UL, VH, VL, WH, and WL to drive the respective switching elements 91 through 96, output from the pre-driver 80. The pre-driver 80 is provided in a previous stage of the main driver 90. The pre-driver 80 includes a driving-phase controller 81 and three drive amplifiers 82, 83, and 84.

The switch-control signals UH, VH, and WH are coupled to the switch-control signal UL, VL, and WL. The driving-phase controller 81 classifies the phases into a synchronous rectification phase to operate in synchronously commutated with PWM duty cycle of the PWM signal from the motor controller 60, a low-side phase to turn on in only low-side, and a high-side phase to turn off in both high-side and low-side. The driver-phase controller 81 drives the synchronous rectification phase in accordance with the PWM signal whose duty cycle is determined by the motor controller 60.

Herein, the motor M1 is driven and rotated by determining signal logic of the phase information signals (sensing signals) U2, V2, and W2 generated based on the sensor signals from the magnetic sensors (commutation-current switching sensors) S1 through S3 to obtain the position information disposed adjacent to the rotor of the motor M1, to sort an operation state of the phases into a PWM synchronous-rectification state, a low-side on state, and a both sides off state.

That is, the motor driver 70 selectively sends a current of the control signals (UH, UL, VH, VL, WH, and WL) to one of the coils in the motor M1 to drive the motor M1 in response to the PWM signal generated by the motor controller 60. The phase information signals U2, V2, and W2 (sensing signals) determine which one of the control signals is selected for the multi-phase (U-phase, V-phase, or W-phase) coils. The motor driver 70 (pre-driver 80) sort-outs (separates) the phase in synchrony with the PWM signal from the other phases based on the sensing signals (phase information signals) U2, V2, and W2 from the commutation-current switching sensors S1 through S3, so as to selectively send the current to the coil having the synchronized phase.

Figure 8:
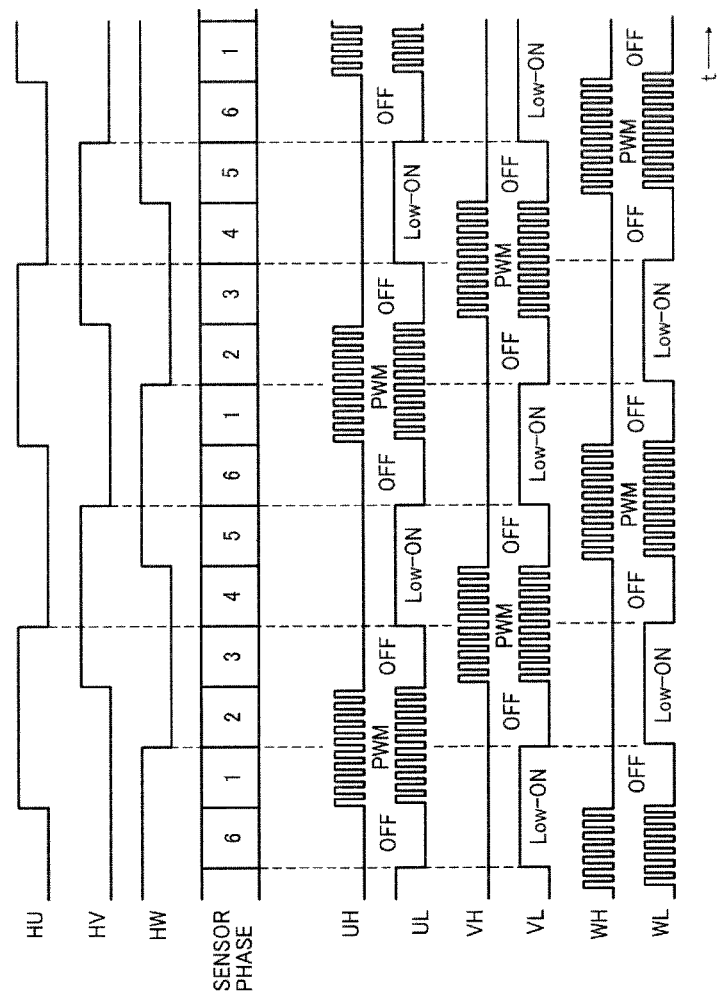
FIG. 8 is a timing chart illustrating respective signals of the operation of the motor driver shown in FIG. 7.

FIG. 8 is a timing chart illustrating respective signals of the operation of the motor driver 70 shown in FIG. 7. FIG. 8 illustrates examples of switching in respective states in the signal logic, which is general driving way to drive the brushless motor M1.

The motor controller 60 appropriately controls the duty-cycle of the PWM signal, based on the phase and the position information of the rotating motor M1 as accurate as possible. It is to be noted that, without providing the motor controller 60 and inputting the PWM signal from providing the motor controller 60, by inputting a drive control voltage to the motor driver 70, the motor driver 70 may compare the input drive control voltage with a triangular wave having a constant frame cycle to generate a PWM signal.

In FIG. 6, a feature of the motor drive controller 1-B is that, the sensor signals from the commutation-current switching sensors (input to the motor driver 70 for driving the brushless motor M1) are used in common with the multiple sensor signals generated by the multiple rotational angle detectors (sensors S1 through S3) used in the first and the second embodiments. In addition, the first phase-information detection circuit 10-B as described in the first and second embodiments can be used in the motor driver controller 1-B according to the present configuration device for switching the coils of the motor M1 to which the commutation current is sent. More specifically, the motor driver 70 determines which phase of the rotor of the motor M1 is driven among U-phase, V-Phase, and W-phase based on the signals U2, V2, and W2 from the commutation-current switching sensors S1, S2, and S3 via the first phase-information detection circuit 10-A and the signal amplification circuit 50.

That is, since the signals from the present rotational angle detectors S1, S2, and S3 are used as the signals from the commutation-current switching sensors, the motor driver controller 1-B can acquire multiple types of the phase information without adding the additional sensors.

Fourth Embodiment

Figure 9:
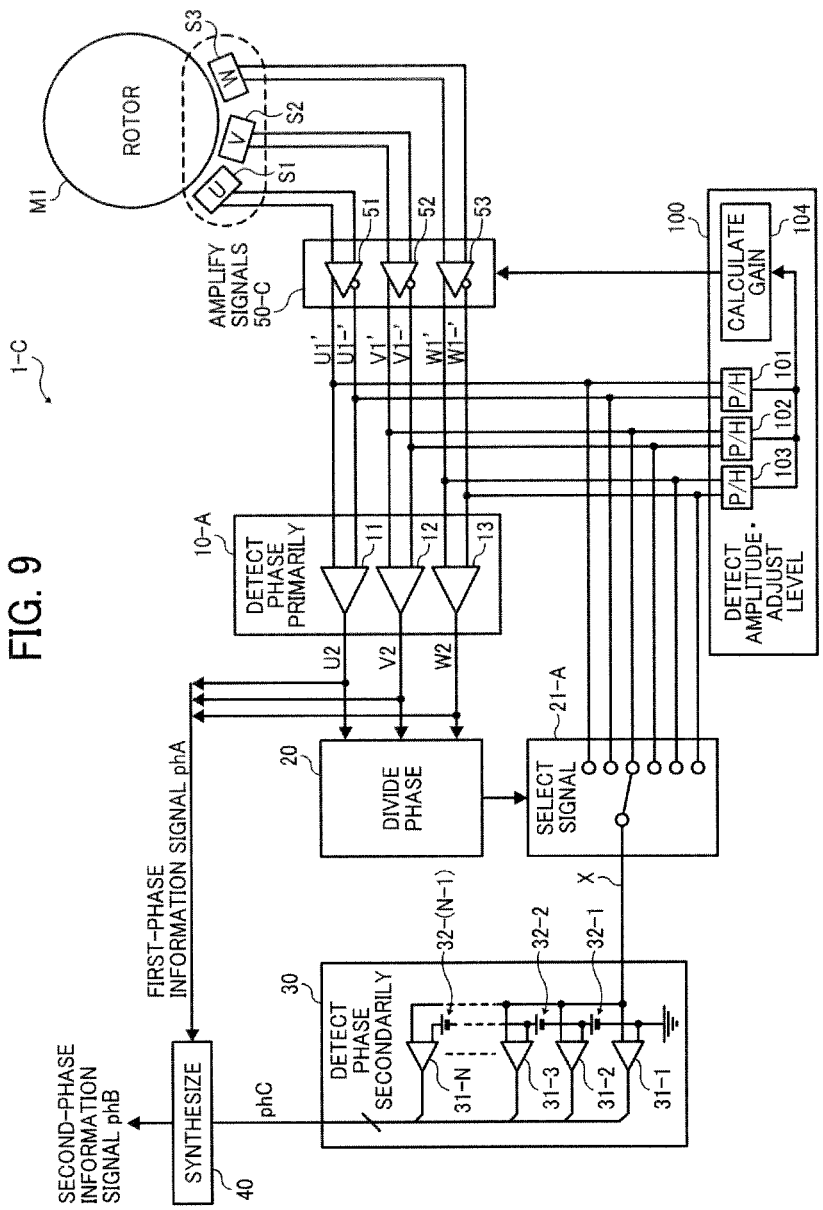
FIG. 9 is a block diagram illustrating a configuration of a motor drive controller according to a fourth embodiment.

FIG. 9 is a block diagram illustrating a configuration of a motor drive controller 1-C according to a fourth embodiment. Compared to the motor drive controller 1-A of the second embodiment shown in FIG. 5, the motor drive controller 1-C of the fourth embodiment includes an amplitude detection control circuit 100. Other configuration is similar to that of the second embodiment; therefore, description thereof is omitted.

The amplitude detection control circuit 100 includes, for example, sample-hold circuits (peak holders; amplitude detectors) 101, 102, and 103 corresponding to the sensors S1, S2, and S3, and a gain calculation circuit (amplitude adjuster) 104. The amplitude detection control circuit 100 calculates the gain of the amplified sensor signals (U1', U1−'; V1', V1−'; W1', W1−') so that the detected amplitudes are set to predetermined amplitude and feeds the gain back to a signal amplification circuit 50-C.

As described above, as the respective sensor signals often have uneven common levels and amplitude levels, the motor drive controller 1-C of the present disclosure can includes an adjusting device to adjust the common levels and the amplitude levels. An adjusting example is described below.

In the amplitude detection control circuit 100, the peak-holders (amplitude detectors) 101 through 103 detect peak values of the amplitude of the respective sensor signals (amplified sensor signals U1', U1−'; V1', V1−'; and W1', W1−') or hold the amplitude at the predetermined electrical angle (e.g., sensor cross point) and estimate the peak-level using level converter to convert the value into the peak value. Then, the gain calculation circuit 104 calculates the gain so that the detected peak level or the estimated peak level is set to the predetermined amplitude level. Then, the gain calculation circuit 104 feeds back the detected peak level or the estimated peak level to the signal amplifier circuit 50, using an up-down counter, and adjusts the amplitude level which enables the respective sensors S1 through S3 to output the appropriate amplitude level. Accordingly, the phase information close to the actual rotary angle of the rotor can be obtained.

Fifth Embodiment

Figure 10:
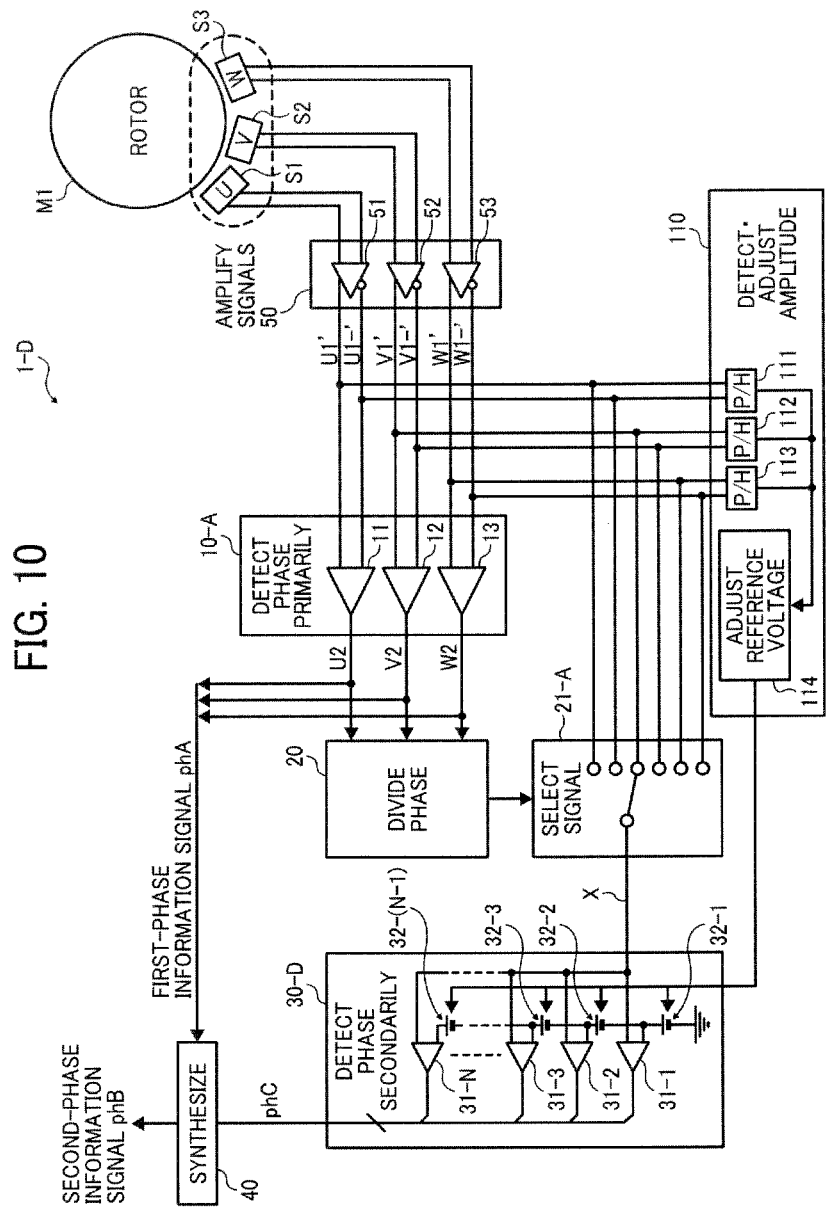
FIG. 10 is a block diagram illustrating a configuration of a motor drive controller according to a fifth embodiment.

FIG. 10 is a block diagram illustrating a configuration of a motor drive controller 1-D according to a fifth embodiment. Compared to the motor drive controller 1-A of the second embodiment, the motor drive controller 1-D of the fifth embodiment includes an amplitude-detection level-adjustment circuit 110 to output an signal to a second phase-information detection circuit 30-D, and the second phase-information detection circuit 30-D adjusts the reference threshold levels of the voltage source 32-1 through 32-(N−1) corresponding to signal level (result signal) of the signal detected by the amplitude-detection level-adjustment circuit 110. The other configuration of the fifth embodiment is similar to that of the second embodiment; and therefore, the description thereof is omitted.

The amplitude-detection level-adjustment circuit 110 includes sample-hold circuits (amplitude detectors) 111, 112, and 113, and a reference voltage adjusting circuit (threshold level adjuster) 114. Herein, the operation that the different amplitude levels of the respective sensors S1, S2 and S3 are changed to respective reference levels per selection signal X input to the second phase-information detection circuit 30-D is equal to the operation that the corresponding sensor amplitude levels are adjusted. In the present embodiment, the phase information close to the actual rotational angle can be acquired.

In addition, the amplitude detectors (peak holders) 111, 112, and 113 and the second phase-information detection circuit 30 can be formed integrally as a single circuit.

Herein, although the amplitude-detection level-adjustment circuit 110 detects the respective amplified sensor signals (U1', U1−'; V1', V1−'; W1', W1−') from the signal amplifier circuit 50 in this embodiment, the amplitude-detection level-adjustment circuit 110 may directly detect the respective sensor signals (U1, U1−; V1, V1−; W1, W1−) from the sensors S1, S2, and S3.

Sixth Embodiment

Although figures are omitted, in a motor drive controller according to a sixth embodiment, using comparator groups (41-1 through 41-N, 42-1 through 42-N) shown in FIGS. 3A and 3B in the second phase-information detection circuit 30, the amplitude levels are adjusted, which is efficient.

For example, when the number of comparators in the comparator-group is 16, the second phase-information detection circuit 30 is assumed as a simple parallel type AD converter, which can detect or forecast the peak amplitude level of the respective phases.

For example, when the selection signal does not exceed the phase information signal ph(n), the peak amplitude of the selection signal X can be concluded as the value higher than the phase information signal ph (n−1) and lower than the phase information signal (n). The reference voltage and the gain are adjusted based on this result, which can reduce the entire size of the motor drive controller.

In the motor driver controller having above-described configurations of the fourth to sixth embodiments, adjusting the amplitude gain or adjusting reference voltage can be performed during initial rotation of the motor M1, or while monitoring the rotation of the motor M1 in real time. In addition, the zero-cross point of the sensor signal is the best timing for adjusting the gain of the signal amplification circuit 50-C and adjusting the reference voltage of the second phase-information detection circuit 30-D.

Seventh Embodiment

Figure 11:
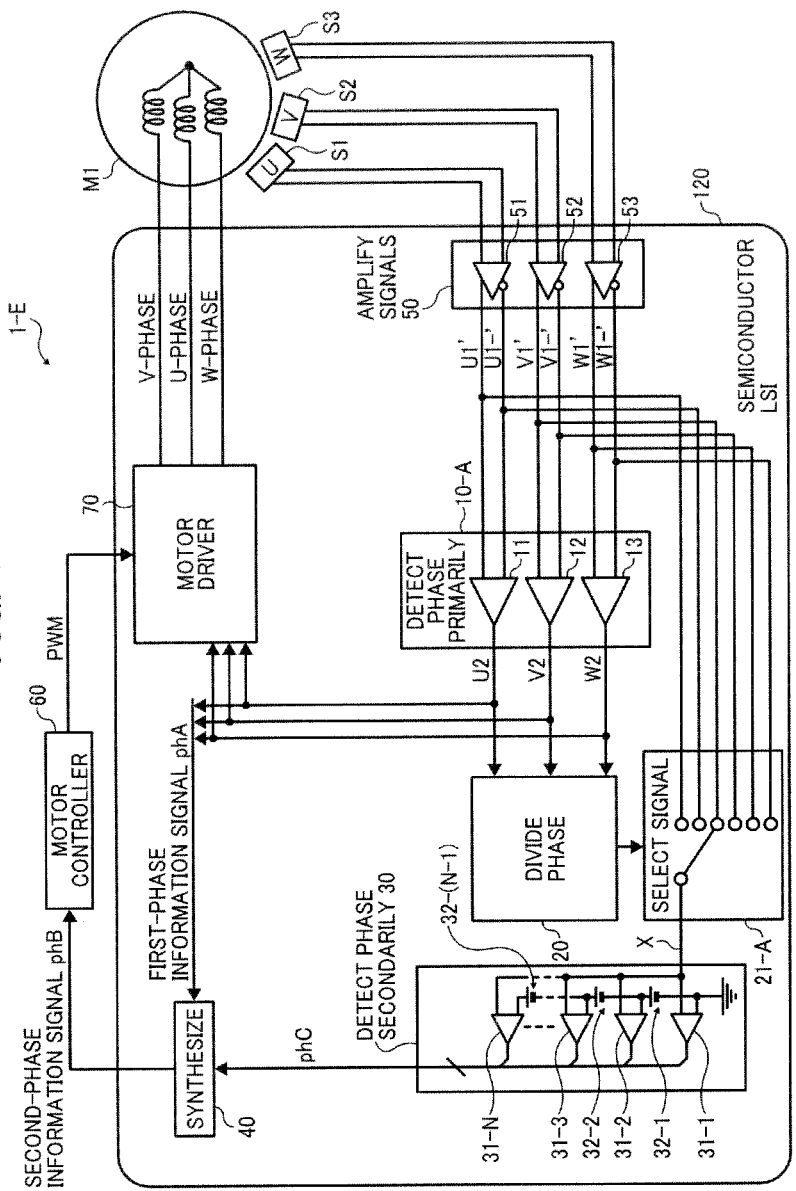
FIG. 11 is a block diagram illustrating a configuration of a motor drive controller according to a seventh embodiment.

FIG. 11 is a block diagram illustrating a configuration of a motor drive controller 1-E according to a seventh embodiment. As a feature of the seventh embodiment, in the motor drive controller 1-E of the present embodiment, the circuits of the motor drive controller 1-B of the third embodiment, except the motor M1, the sensors S1 through S3, and the motor M1, are integrated as a single unit of a semiconductor integrated circuit (semiconductor LSI) 120.

In general, the motor driver 70 is originally integrated in a semiconductor integrated circuit. In addition, by putting the multi-phase information detection circuits 10 and 30 on the same chip, without increasing the size of the circuit, the circuit can be compact without providing the optical encoder.

As configurations of integrating as the semiconductor LSI (semiconductor device) 120, the configuration is not limited to the device 120 shown in FIG. 11. For example, only the phase information-detection circuits 10 and 30 may be integrated as a single unit, or the motor controller 60 in addition to the circuit shown in FIG. 11 may be integrated.

As the motor driver 70 shown in FIG. 7 to drive the drive phase coil works as a heating source, only the motor driver 70 may be separated from the integrated circuit in some case. Alternatively, the second phase-information detection circuit 30 and the amplitude detection control circuit 100 or the amplitude-detention level-adjustment circuit 110 may be integrated as the same integrated circuit.

In FIG. 11, similarly to FIG. 6, the sensor signals (sensing signals) from the commutation-current switching sensors (input to the motor driver 70 for driving the brushless motor M1) are used in common with the multiple sensor signals generated by the multiple rotational-angle detectors (sensors S1 through S3) used in the first through fifth embodiments.

As described above, the sensors S1 through S3 are the magnetic sensors to detect the rotor of the motor M1, and Hall elements are generally used as the sensors S1 through S3. It is often the case that a magnetic flux density generated by rotating the rotor is sine wave, and accordingly, the signal from the magnetic sensor is the sine wave.

It is to be noted that, the magnetic flux density received in the fixed magnetic sensor while generating the magnetic flux by rotating the rotor is not always regular sine wave, and sometimes the magnetic flux density may be irregular sine wave. Further, due to the magnetic saturation caused by exceeding the sensed magnetic flux density over an acceptable value of the magnetic sensor, the output of the magnetic sensor may be saturated and wave of the output may become a trapezoid wave.

However, in a cycle of electrical angle of −60° to 60°, if the magnetic flux density is sine wave or similar sine wave, the circuit of the present disclosure can detect accurate multi-phases.

As described above, in the motor drive controller of the present disclosure can detect accurate phases of the rotors to some extents based on the multiple magnetic sensors arranged adjacent to the rotor of the motor.

For example, by outputting the detected phase information as the phase-position information to the motor controller as the digital signal, driving the motor can be controlled.

Furthermore, by integrating the motor drive controller, without using an expensive rotary optical encoder, the motor drive controller that can become small and can include a phase detection device to detect finely smaller than the changing interval of the magnetic sensor can be realized.

Numerous additional modifications and variations are possible in light of the above teachings. It is therefore to be understood that, within the scope of the appended claims, the disclosure of this patent specification may be practiced otherwise than as specifically described herein.

What is claimed is:

1. A motor drive controller to drive and control a motor that has a rotor and multi-phase coils inside the rotor, based on multiple rotational angle detectors that generate multiple sensor signals corresponding to different positions of the rotor; the motor drive controller comprising:
    a first phase detector to compare a respective one of multiple sensor signals with a paired sensor signal from the same rotational angle detector to detect phases of the rotor, and output a first phase information signal representing a first detected phase;
    a phase divider to divide the phases, detected by the first phase detector, into multiple predetermined phase intervals;
    a signal selector to select one of the respective multiple sensor signals from the multiple rotational angle detectors, in the multiple predetermined phase interval; and
    a second phase detector to detect whether the signal selected by the signal selector reaches a predetermined threshold level corresponding to a predetermined phase of the rotor, and output a second phase information signal representing a second detected phase different from the first detected phase.

2. The motor drive controller according to claim 1, further comprising:
    a synthesizer to synthesize the first phase information signal and the second phase information signal to generate a digital signal for at least one phase,
    wherein the digital signal is used as a motor driver control signal to drive the motor.

3. The motor drive controller according to claim 2, further comprising:
    a motor controller to receive the digital signal the synthesizer to generate a PWM signal based on the digital signal; and
    a motor driver to generate control signals and selectively send a current of the control signal to one of the coils in the motor to drive the motor in response to the PWM signal generated by the motor controller,
    wherein the motor drive controller is connected to commutation-current switching sensors to generate a sensing signal to determine which one of the control signals is selected for the multi-phase coil,
    wherein the motor driver separates one phase in synchrony with the PWM signal from the other phases of the control signals based on the sensing signals from the commutation-current switching sensors, to selectively send the current to the coil having the synchronized phase, and
    wherein the sensing signals from the commutation-current switching sensors are used in common with the multiple sensor signals generated by the multiple rotational angle detectors.

4. The motor drive controller according to claim 1, further comprising:
    an amplitude detector to detect peak levels of the respective sensor signals to output a result signal; and
    a threshold level adjuster to generate an adjusting signal for output to the second phase detector to adjust the predetermined threshold level,
    wherein the second phase detector to detect whether the signal selected by the signal selector reaches the predetermined threshold level adjusted by the threshold level adjuster, corresponding to the predetermined phase of the rotor, and outputs the second phase information signal representing second detected phases.

5. The motor drive controller according to claim 4, wherein the second phase detector is used in a common with the amplitude detector.

6. The motor drive controller according to claim 1, wherein the respective divided intervals divided by the signal divider are detected in a common single second phase detector.

7. The motor drive controller according to claim 1, wherein the phase divider divides the phase into intervals corresponding to electrical angles of 120°.

8. The motor drive controller according to claim 1, wherein the phase divider divides the phase into intervals corresponding to electrical angles of 60°.

9. The motor drive controller according to claim 1, wherein the sensor signal is a sine wave.

10. The motor drive controller according to claim 1, wherein the phase divider divides the phase into intervals corresponding to 60° intervals of an electrical angle of the motor.

11. The motor drive controller according to claim 1, wherein the sensor signal is a sine wave.

12. A motor drive controller to drive and control a motor that has a rotor and multi-phase coils inside the rotor, based on multiple rotational angle detectors to generate multiple sensor signals corresponding to different positions of the rotor, the motor drive controller comprising:
   a signal amplifier to adjust and amplify amplitudes of the multiple sensor signals;
   a first phase detector to compare a respective one of the multiple amplified sensor signals with a paired amplified sensor signal from the same rotational angle detector via the signal amplifier, to detect phases of the rotor, and output a first phase information signal representing a first detected phase;
   a phase divider to divide the phases, detected by the first phase detector, into multiple predetermined phase intervals;
   a signal selector to select one of the respective multiple amplified sensor signals from the signal amplifier, in the multiple predetermined phase interval; and
   a second phase detector to detect whether the signal selected by the signal selector reaches a predetermined threshold level corresponding to a predetermined phase of the rotor, and outputs a second phase information signal representing a second detected phase different from the first detected phase.

13. The motor drive controller according to claim 12, further comprising:
   a synthesizer to synthesize the first phase information signal and the second phase information signal to generate a digital signal for at least one phase,
   wherein the digital signal is used as a motor driver control signal to drive the motor.

14. The motor drive controller according to claim 13, further comprising:
   a motor controller to receive the digital signal from the synthesizer to generate a PWM signal based on the digital signal; and
   a motor driver to generate control signals and selectively send a current of the control signal to one of the coils in the motor to drive the motor in response to the PWM signal generated by the motor controller,
   wherein the motor drive controller is connected to commutation-current switching sensors to generate a sensing signal to determine which one of the control signals is selected for the multi-phase coil,
   wherein the motor driver separates one phase in synchrony with the PWM signal from the other phases of the control signals based on the sensing signals from the commutation-current switching sensors, to selectively send the current to the coil having the synchronized phase, and
   wherein the sensing signals from the commutation-current switching sensors are used in common with the multiple sensor signals generated by the multiple rotational angle detectors.

15. The motor drive controller according to claim 12, further comprising:
   an amplitude detector to detect peak levels of the respective amplified sensor signals from the signal amplifier, to output a result signal; and
   a threshold level adjuster to generate an adjusting signal for output to the second phase detector to adjust the predetermined threshold level,
   wherein the second phase detector detects whether the signal selected by the signal selector reaches the predetermined threshold level adjusted by the threshold level adjuster, corresponding to the predetermined phase of the rotor, and outputs the second phase information signal representing second detected phases.

16. The motor drive controller according to claim 15, wherein the second phase detector is used in a common with the amplitude detector.

17. The motor drive controller according to claim 12, further comprising:
   an amplitude detector to detect peak levels of the respective amplified sensor signals, to output a result signal; and
   an amplitude calculator to calculate a desired amplitude level of the amplified sensor signals in accordance with the result signal from the amplitude detector and feed back the calculated result to the signal amplifier,
   wherein the signal amplifier adjusts and amplifies amplitudes of the multiple sensor signals based on the calculated result from the amplitude calculator.

18. The motor drive controller according to claim 12, wherein the respective divided intervals divided by the signal divider are detected by a common single second phase detector.

19. The motor drive controller according to claim 12, wherein the phase divider divides the phase into intervals corresponding to 120° intervals of an electrical angle of the motor.

20. A control method of driving and controlling a motor that has a rotor and multi-phase coils inside the rotor, based on multiple sensor signals, generated by multiple rotational angle detectors, corresponding to different positions of the rotor,
   the method comprising the steps of:
   comparing a respective one of the multiple sensor signals with a paired sensor signal from the same rotational angle detector to detect phases of the rotor;
   outputting a first phase information signal representing a first detected phase;
   dividing the detected phase into multiple predetermined phase intervals;
   selecting one of the multiple sensor signals, in the multiple predetermined phase interval;
   detecting that a level of the selected signal reaches a predetermined threshold level corresponding to a predetermined phase of the rotor; and
   outputting a second phase information signal representing a second detected phase different from the first detected phase.

* * * * *